Figure 1:
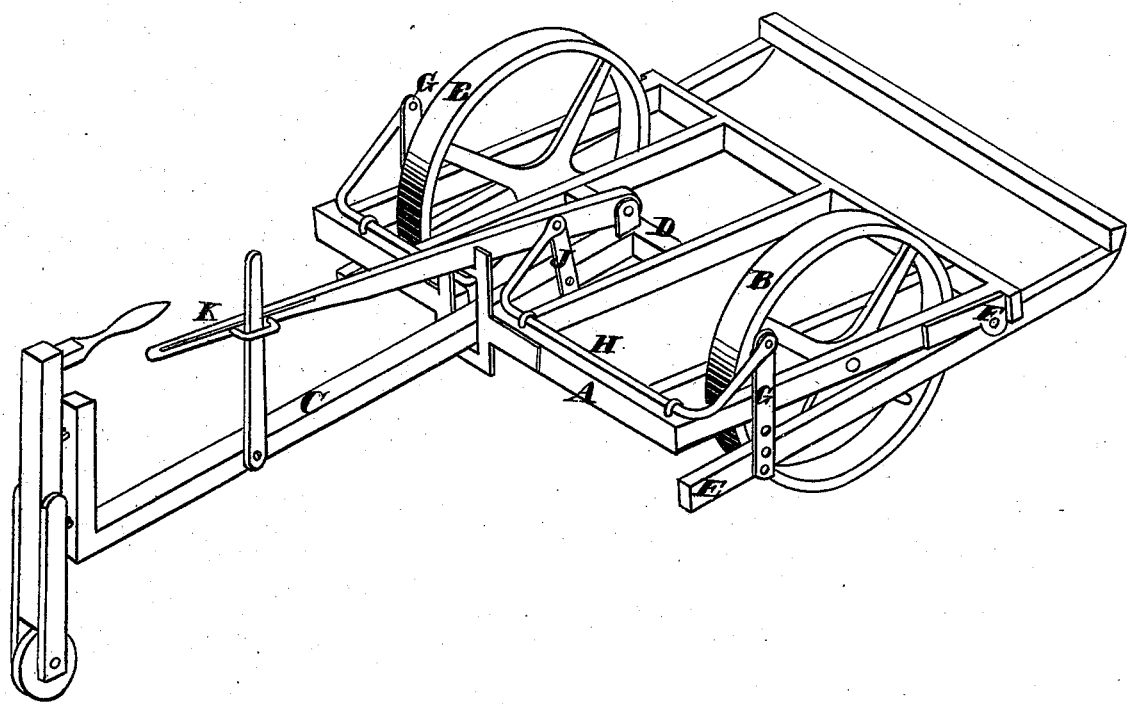

H. D. WILLARD.
HARVESTER.

No. 173,382. Patented Feb. 8, 1876.

Witnesses
Geo. H. Strong
Jno. L. Boone

Inventor
Henry D. Willard
by Dewey & Co.
his Attorneys

UNITED STATES PATENT OFFICE.

HENRY D. WILLARD, OF VACAVILLE, CALIFORNIA.

IMPROVEMENT IN HARVESTERS.

Specification forming part of Letters Patent No. 173,382, dated February 8, 1876; application filed October 29, 1875.

*To all whom it may concern:*

Be it known that I, HENRY D. WILLARD, of Vacaville, Solano county, State of California, have invented an Improvement in Headers; and I do hereby declare the following description and accompanying drawings are sufficient to enable any person skilled in the art or science to which it most nearly appertains to make and use my said invention or improvement without further invention or experiment.

My invention relates to certain improvements in headers for cutting grain; and it consists in the use of a supplemental frame carrying the elevator-belt or draper, and so hinged or connected with the main frame that the two may be depressed for low grain without changing the level of the draper.

Referring to the accompanying drawing for a more complete explanation of my invention, Figure 1 is a perspective view of my machine.

A is the ordinary header-frame, and B B are the bearing-wheels. The tongue or pole C is mortised or otherwise secured to the transverse timber or shaft D, which has journals turning in the frame A in a line with the axles of the wheels. In order to allow the tongue to extend to this point, the back timber of the frame A has a space cut into it just wide enough to allow the tongue to move freely, and this space is re-enforced or strengthened in any suitable manner to retain the strength of the frame-timber. Below the frame A a supplemental frame, E, is placed, being hinged to the main frame at the points F near the front. This frame E extends to the front far enough to support the carrying-belt or draper and the cutters of the machine. From its rear end links G extend upward, and connect it with the crank-arms of the shaft A, which turn in boxes upon the rear timber of the frame A, as shown. The inner ends of the shaft are also provided with crank-arms, and these are connected with the pole by links J, so that when the front end of the frame A is depressed by the use of the lever K, the action of the links J will be to retain the frame E in a position nearly parallel with the ground.

All farmers are aware that with the usual style of headers, especially with the short frame and high wheels, there is always a great loss of grain when the straw is at all short, as the angle of the whole machine has to be so great in order to cut close to the ground that the grain is constantly rolling off the cutter-bar and draper. With this machine the fault is remedied, while I am still enabled to retain the advantages of the short frame and high wheels, because the frame E is retained in a nearly horizontal position, whatever may be the changes in the angle of the main frame A in depressing the front end and the cutters. By coupling the tongue in a line with the axles of the driving-wheels, the driver has complete control of the machine, without being obliged to lift against the pushing of the team, and the tongue is maintained at all times in a horizontal position, no matter how much the frame A may be elevated or depressed. This is also essential to the perfect action of the links and crank-shaft H upon the frame E.

I am aware that the tongue has heretofore been hinged to the front end of the main frame A, passing through the rear timber, in a manner similar to my device; but in this case the difficulty experienced with the old style has only been reversed, as, when the point of support of the tongue is either above or below the central line, it has a tendency to crowd the machine into the ground or to lift it, and in either case it must be operated against the push of the team, and the tongue is subjected to changes in level, either high or low.

Having thus described my invention, what I claim, and desire to secure by Letters Patent, is—

The supplemental cutter-bar supporter E, hinged to the frame A, in combination with the crank-shaft H, links G and J, and the tongue C, substantially as and for the purpose herein described.

In witness whereof I hereunto set my hand and seal.

HENRY DODGE WILLARD. [L. S.]

Witnesses:
 JNO. L. BOONE,
 C. M. RICHARDSON.